J. C. WRIGHT.
SAFETY DOG TRIP FOR COTTON PRESSES.
APPLICATION FILED FEB. 20, 1909.

937,135. Patented Oct. 19, 1909.

WITNESSES:

INVENTOR
J. C. Wright
BY
ATTORNEY

UNITED STATES PATENT OFFICE.

JOHN C. WRIGHT, OF SEYMOUR, TEXAS.

SAFETY-DOG TRIP FOR COTTON-PRESSES.

937,135.  Specification of Letters Patent.  Patented Oct. 19, 1909.

Application filed February 20, 1909. Serial No. 479,185.

*To all whom it may concern:*

Be it known that I, JOHN C. WRIGHT, a citizen of the United States, residing at Seymour, in the county of Baylor and State of Texas, have invented certain new and useful Improvements in Safety-Dog Trips for Cotton-Presses, of which the following is a specification.

My invention relates to new and useful improvements in safety dog trips for cotton presses.

Press boxes commonly in use are made double and mounted to revolve, one box standing under the tamper and the other over the press head. Dogs are arranged in the sides of the boxes to hold the cotton during the tamping. These dogs must be withdrawn when the box is swung around over the press head, and it has been the practice to withdraw them by hand. If the operator should forget to unhook the dog rods and "run" the press head "up" for tying the bale, he either breaks the hangers or the rods, making the press useless.

It is, therefore, the object of my invention to provide means for automatically withdrawing the dogs as the box is swung around, and preventing not only the above accident but saving time on the part of the operator.

Finally, the object of my invention is to provide a device of the character described that will be strong, durable, simple, efficient and comparatively inexpensive to construct, also one in which the several parts will not be liable to get out of working order.

Figure 1:
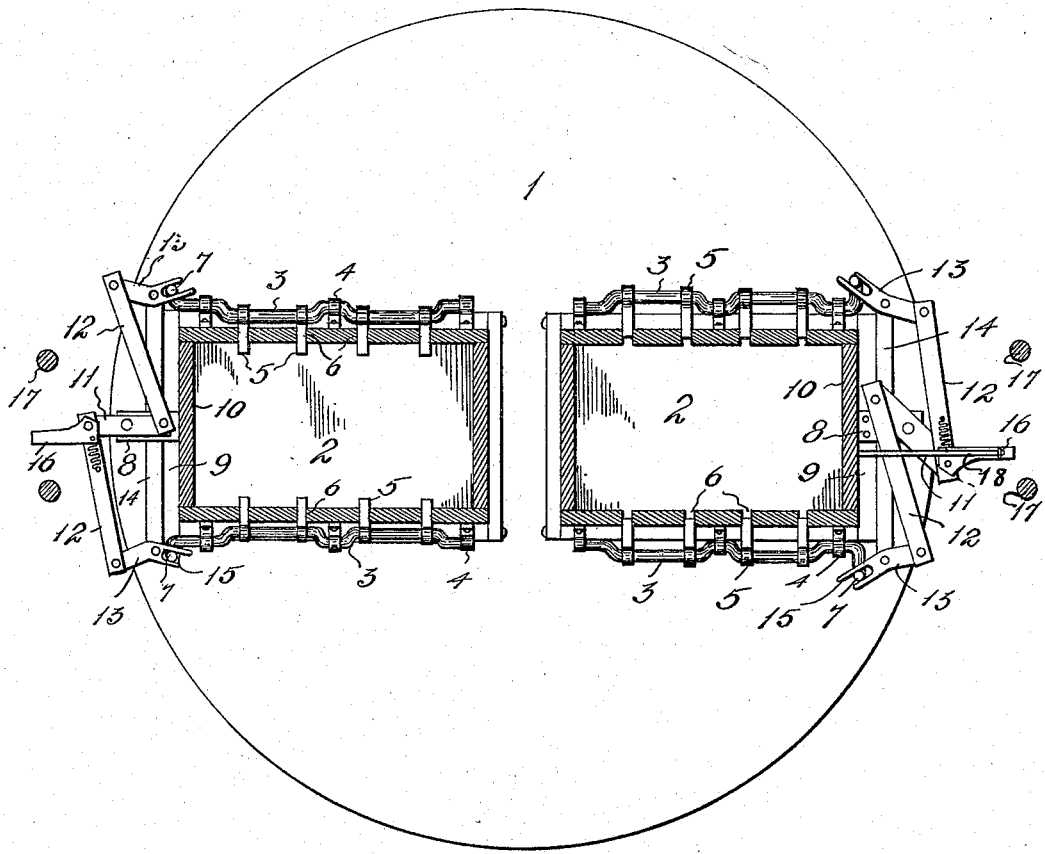
Figure 2:
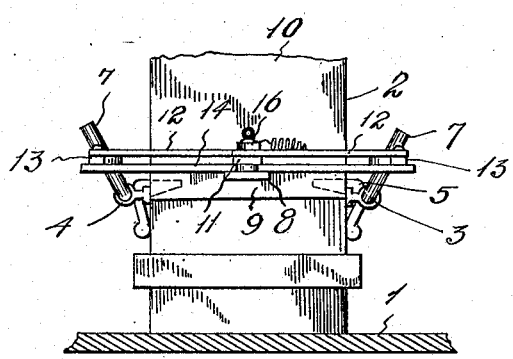

With the above and other objects in view, my invention has particular relation to certain novel features of construction and operation, an example of which is described in the following specification and illustrated in the accompanying drawings, wherein:

Figure 1 is a plan view, with the boxes in section, and Fig. 2 is a partial end elevation of the box, showing the trip.

In the drawings the numeral 1 designates the platform or turn-table on which the press boxes 2 are mounted and arranged in the usual manner. On the sides of the boxes crank shafts 3 are mounted in bearing brackets 4. The shafts are commonly called "dog rods," as dogs 5 projecting laterally through slots 6 in the side walls and into the boxes are pivoted thereon. At its outer end each shaft is formed with an upward and outwardly directed arm 7. By swinging the arms outward, the crank shafts are rocked and the dogs withdrawn, thus permitting the press head to "run up" and press the cotton.

By returning or swinging the arm inward, the dogs are projected into the box. It is understood that one box is over the press head and the other under the tamper. While the box is under the tamper the dogs are projected inward, as shown at the left hand side of Fig. 1. The dogs hold the cotton in the box and prevent it from being carried upward by the tamper. When the box is over the press head the dogs are withdrawn, as shown at the right hand side of Fig. 1, for the reasons stated.

For automatically operating the crank shafts, I mount a bracket 8 on the cross piece 9 of each end door 10, and at the center thereof. A lever 11 is pivoted centrally at the outer end of the bracket. Links 12 having their inner ends pivoted to the opposite ends of the lever are pivoted at their outer ends to the outer ends of bent levers 13 centrally pivoted on the ends of crossbars 14 extending from the bracket 8. At their inner ends the levers 13 are bifurcated as indicated at 15 in Fig. 1, to receive the upper ends of the arms 7. It is obvious that by swinging the lever 11, the links are thrown inward or outward, the bent levers 13 swing and the arms 7 swing and crank shafts 3 are rocked, thus operating the dog.

For swinging the lever 11, a spring held trip 16 is pivoted on the outer end directly on the link, so as to project between the press uprights 17. By observing Fig. 1 it will be seen that the lever 11 of one box is swung to withdraw the dogs; while the other is in its normal position to allow the dogs to project into the box.

A rod 18 is secured at one end to the outer end of spring held trips 16 and its other end passes into a hole in the side of the press box 2 to hold the device in place while tamping the cotton and when the press box is swung over the press head and spring held trip 16 strikes press uprights 17 and the trip 16 is sprung withdrawing dogs 5 from press box 2 the rod 18 is also withdrawn.

What I claim, is:

1. In a safety dog trip for cotton compresses, the combination with a support, of levers mounted on the support adapted to engage with the dog rods, means for operating the levers simultaneously, and means for securing the support to the box of a cotton compress.

2. In a safety dog trip for cotton compresses the combination with a support, of levers mounted on the support adapted to engage with the dog rods, means for operating the levers simultaneously, means for operating the operating means, and means for securing the support to the box of a cotton compress.

3. In a safety dog trip the combination with a support, of a lever mounted on the support, other levers engaging with dog rods carried by the press box, means for operating the levers simultaneously, and means for operating the operating means.

4. In a safety dog trip the combination with a support, of a lever mounted on the support, a plurality of bifurcated levers mounted on the support adapted to engage with dog rods carried by the press box, links connecting the last named levers to the first named levers and means for operating the levers automatically.

In testimony whereof I have signed my name to this specification in the presence of two subscribing witnesses.

JOHN C. WRIGHT.

Witnesses:
  W. H. FRANCIS,
  F. L. FAUCHER.